US010949516B2

(12) United States Patent
Uno

(10) Patent No.: US 10,949,516 B2
(45) Date of Patent: Mar. 16, 2021

(54) INFORMATION PROCESSING APPARATUS, RECORDING MEDIUM FOR RECORDING BIOMETRIC AUTHENTICATION PROGRAM, AND BIOMETRIC AUTHENTICATION METHOD

(71) Applicant: FUJITSU LIMITED, Kawasaki (JP)

(72) Inventor: Kazuya Uno, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 16/225,340

(22) Filed: Dec. 19, 2018

(65) Prior Publication Data
US 2019/0205516 A1    Jul. 4, 2019

(30) Foreign Application Priority Data

Dec. 28, 2017    (JP) .............................. JP2017-253664

(51) Int. Cl.
*G06F 21/32* (2013.01)
*G06K 9/00* (2006.01)
(Continued)

(52) U.S. Cl.
CPC ......... *G06F 21/32* (2013.01); *G06K 9/00087* (2013.01); *G06K 9/00093* (2013.01);
(Continued)

(58) Field of Classification Search
CPC ............ G06K 9/00073; G06K 9/6211; G06K 9/00026; G06K 9/00087; G06K 9/00288;
(Continued)

(56) References Cited

U.S. PATENT DOCUMENTS 5,706,498 A *  1/1998 Fujimiya ............... G16B 50/00
                                                     702/20
7,809,168 B2* 10/2010 Abiko ................. G06F 3/03547
                                                     382/115
(Continued)

FOREIGN PATENT DOCUMENTS

EP          2600307 A1     6/2013
JP         2017-010419     1/2017

OTHER PUBLICATIONS

Manuel Flores et al., "Fingerprint Verification Methods Using Delaunay Triangulations", The International Arab Journal of Information Technology, vol. 14, No. 3, May 2017, pp. 346-354, XP055586332. Cited in ESSR dated May 16, 2019 for corresponding European Patent Application No. 18212016.2.

(Continued)

*Primary Examiner* — Vu Le
(74) *Attorney, Agent, or Firm* — Fujitsu Patent Center

(57) ABSTRACT

An information processing apparatus includes: a memory, and a processor configured to extract feature points from a biometric image of a living body, generate groups each including a certain number of feature points, obtain a first feature value of each of the groups, compares the first feature value with a second feature value which is a feature value of each of groups each including the certain number of feature points included in enrolled biometric information, specify, as a pair, two groups similar to each other, obtain a first degree of similarity between a first feature point included in a first group of the pair and a second feature point included in a second group of the pair in accordance with a number of groups similar to the first group of the pair, and authenticate the living body based on the degree of similarity.

15 Claims, 11 Drawing Sheets

(51) Int. Cl.
  *G06K 9/46* (2006.01)
  *G06K 9/62* (2006.01)

(52) U.S. Cl.
  CPC ..... *G06K 9/00288* (2013.01); *G06K 9/00926* (2013.01); *G06K 9/46* (2013.01); *G06K 9/6202* (2013.01); *G06K 9/6215* (2013.01); *G06K 2009/00932* (2013.01)

(58) Field of Classification Search
  CPC ........ G06K 9/036; G06K 9/3233; G06K 9/46; G06K 9/6202; G06K 9/6215; G06K 9/6807; G06K 9/6255; G06K 9/68; G06K 2009/00932; G06K 9/0008; G06K 9/00006; G06K 9/00093; G06K 9/00892; G06K 9/4671; G06F 2203/0338; G06F 3/03547; G06F 21/32; Y10S 707/99931; Y10S 707/99936
  USPC ........ 382/103, 115, 117, 125, 203, 124, 209
  See application file for complete search history.

(56) References Cited

U.S. PATENT DOCUMENTS

| | | | | |
|---|---|---|---|---|
| 10,671,831 B2* | 6/2020 | Riopka | .............. | G06K 9/00073 |
| 2002/0048390 A1* | 4/2002 | Ikegami | ............... | G06K 9/0008 |
| | | | | 382/124 |
| 2006/0078176 A1* | 4/2006 | Abiko | ............... | G06K 9/00026 |
| | | | | 382/124 |
| 2006/0251339 A1* | 11/2006 | Gokturk | .................. | G06K 9/46 |
| | | | | 382/305 |
| 2008/0247607 A1* | 10/2008 | Amano | .................... | G06K 9/46 |
| | | | | 382/115 |
| 2010/0135531 A1* | 6/2010 | Abe | .......................... | G06T 7/30 |
| | | | | 382/103 |
| 2010/0135538 A1* | 6/2010 | Barral | .................. | G06K 9/6211 |
| | | | | 382/115 |
| 2010/0316261 A1* | 12/2010 | Sugimura | .......... | G06K 9/00087 |
| | | | | 382/115 |
| 2014/0020090 A1* | 1/2014 | Nada | ...................... | G06F 21/32 |
| | | | | 726/19 |
| 2014/0133711 A1* | 5/2014 | Abe | ................... | G06K 9/00067 |
| | | | | 382/115 |
| 2015/0178581 A1* | 6/2015 | Aoki | .................. | G06K 9/00087 |
| | | | | 382/115 |
| 2015/0269410 A1* | 9/2015 | Aoki | ........................ | G06K 9/00 |
| | | | | 382/115 |
| 2016/0149904 A1* | 5/2016 | Kim | ..................... | G06K 9/0061 |
| | | | | 713/186 |
| 2017/0076164 A1* | 3/2017 | Abe | ................... | G06K 9/00892 |

OTHER PUBLICATIONS

Wengang Zhou et al., "Recent Advance in Content-based Image Retrieval: A Literature Survey", Arxiv. Org, Cornell University Library, 201 Olin Library Cornell University Ithaca, NY 14853, Jun. 19, 2017, pp. 1-24, XP080770938. Cited in EESR dated May 16, 2019 for corresponding European Patent Application No. 18212016.2.

ESSR—Extended European Search Report dated May 16, 2019 for corresponding European Patent Application No. 18212016.2.

Miguel Angel Medina-Pérez et al., "Improving Fingerprint Verification Using Minutiae Triplets", Sensors 2012, 12, pp. 3418-3437, (20 pages).

* cited by examiner

FIG. 6

| USER ID | GROUP ID | GROUP FEATURE VALUE |
|---|---|---|
| 0001 | 01 | M01,M05,M21, LENGTH OF EACH SIDE, INTERIOR ANGLES,··· |
| | 02 | M03,M10,M13, LENGTH OF EACH SIDE, INTERIOR ANGLES,··· |
| | ... | ... |
| 0002 | 01 | M08,M20,M32, LENGTH OF EACH SIDE, INTERIOR ANGLES,··· |
| | 02 | M13,M15,M28, LENGTH OF EACH SIDE, INTERIOR ANGLES,··· |
| | ... | ... |
| ... | ... | ... |

INFORMATION PROCESSING APPARATUS, RECORDING MEDIUM FOR RECORDING BIOMETRIC AUTHENTICATION PROGRAM, AND BIOMETRIC AUTHENTICATION METHOD

CROSS-REFERENCE TO RELATED APPLICATION

This application is based upon and claims the benefit of priority of the prior Japanese Patent Application No. 2017-253664, filed on Dec. 28, 2017, the entire contents of which are incorporated herein by reference.

FIELD

The embodiment discussed herein is related to an information processing apparatus, a recording medium in which a biometric authentication program is recorded, and a biometric authentication method.

BACKGROUND

In biometric authentication techniques, biometric features, such as fingerprints, palm prints, veins, and faces, are used in identity verification.

Techniques of the related art are disclosed in Japanese Laid-open Patent Publication No. 2017-10419 or a non-patent document, Miguel Angel Medina-Perez et al., "Improving Fingerprint Verification Using Minutiae Triplets", Sensors 2012, 12(3), pages 3418-3437, 2012.

SUMMARY

According to an aspect of the embodiments, an information processing apparatus includes: a memory; and a processor coupled to the memory and configured to: extract a plurality of feature points from a biometric image of a living body that is to be authenticated; generate a plurality of groups each including a certain number of feature points among the plurality of feature points; obtain a first feature value of each of the plurality of groups; compares the first feature value with a second feature value which is a feature value of each of a plurality of groups each including the certain number of feature points included in enrolled biometric information; specify, as a first pair, two groups similar to each other based on a comparison result; obtain a first degree of similarity between a first feature point included in a first group of the first pair and a second feature point included in a second group of the first pair in accordance with a number of groups similar to the first group of the first pair; and authenticate the living body based on the first degree of similarity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates exemplary enrolled biometric information;

DESCRIPTION OF EMBODIMENTS

Figure 1:
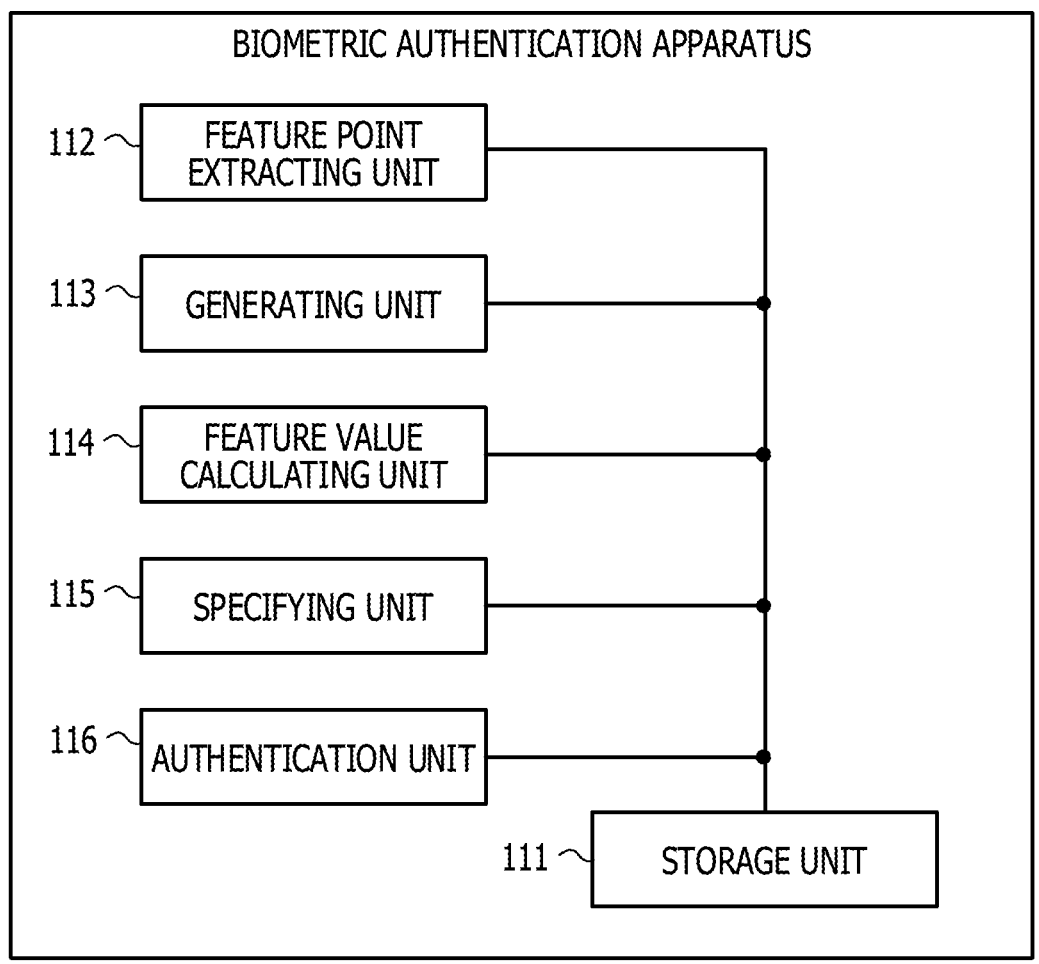
FIG. 1 illustrates an exemplary functional configuration of a biometric authentication apparatus.

For example, in identity verification, biometric features obtained from a living body that is to be authenticated are compared with pre-enrolled biometric features, and the target living body is authenticated based on the similarity between the two types of features.

For example, in fingerprint authentication, the geometric feature value of three feature points extracted from a fingerprint image is used.

For example, in comparison between a fingerprint image and enrolled fingerprint information, the fingerprint image may incorrectly match another person's enrolled fingerprint information.

The above case occurs not only when biometric authentication using fingerprint images is performed, but also when biometric authentication using a different type of biometric images is performed.

For example, there may be provided a technique which improves authentication accuracy of biometric authentication based on a group of feature points extracted from a biometric image.

To improve authentication accuracy of biometric authentication techniques, many methods have been studied and developed. One of the methods is such that feature points extracted from a biometric image of a living body that is to be authenticated are compared with feature points included in enrolled biometric information, not for each feature value, but for each group of feature points by using the relationship among the feature points. This method may enhance accuracy of discrimination between the target person and another person by using the relationship among multiple feature points, achieving improvement of authentication accuracy of biometric authentication.

For example, in a fingerprint authentication process, a triangle whose vertices are a target feature point, which is extracted from a fingerprint image that is to be authenticated, and two feature points around the target feature point is generated. The shape of the triangle and information related to the triangle, such as the number of fingerprint ridges crossing each side, are used to compare the triangle generated from the fingerprint image with a triangle included in enrolled fingerprint information.

However, in a fingerprint authentication process, when a fingerprint image is obtained by using a fingerprint sensor, distortion or misalignment may occur in the obtained fingerprint image due to a different posture or state of the body of an authentication target person. Therefore, even for the same authentication target person, extracted feature points are different every time a fingerprint image is obtained, and it is difficult to extract feature points stably.

When feature points extracted from a fingerprint image are unstable, it is difficult to generate a triangle stably. Therefore, comparison between a set of three feature points, which may fail to be obtained, and enrolled fingerprint information is more difficult than comparison between one feature point and another.

When only two feature points among three feature points forming a triangle are extracted and the remaining one is not extracted, a triangle is not formed. In this case, the number of matching triangles between the fingerprint image and the enrolled fingerprint information is not increased. In contrast, when a feature point is compared with another, the number of matching feature points between the fingerprint image and the enrolled fingerprint information is increased in accordance with the number of extracted pairs of feature points. Thus, comparison between triangles is likely to reduce the probability of success in identity verification compared with comparison between feature points, and may cause authentication failure.

In a fingerprint authentication process, when a triangle formed by three feature points is to be generated, feature points, whose number is n (n is an integer equal to or greater than four), near the target feature point are searched for, and combinations, whose number is $_nC_2$ and each of which forms a triangle, are generated. Thus, even in the case where the presence/absence, the type, or the position of a feature point varies every time a fingerprint image is obtained, and where the stability of near feature points is low, any one triangle among the combinations is highly likely to be generated, increasing the probability of success in identity verification.

However, in this method, generated triangles may overlap each other. Therefore, like Delaunay triangulation or the like, the number of generated triangles is increased compared with a method in which triangles do not overlap each other. Therefore, a triangle generated from a fingerprint image is also highly likely to incorrectly match a triangle included in enrolled fingerprint information for another person.

After comparison between triangles, triangles distantly positioned from each other may be regarded as not matching each other based on the entire positional relationship. Thus, incorrect matching of triangles may be avoided. However, to make an obtained fingerprint image resistant to distortion, it is desirable to allow the criterion, on which it is determined that "the triangles are positioned close to each other (not far from each other)", to cover a certain greater distance range. In such a distance range, it remains highly likely that triangles incorrectly match each other.

FIG. 1 illustrates an exemplary functional configuration of a biometric authentication apparatus. A biometric authentication apparatus 101 in FIG. 1 includes a storage unit 111, a feature point extracting unit 112, a generating unit 113, a feature value calculating unit 114, a specifying unit 115, and an authentication unit 116. The storage unit 111 stores enrolled biometric information in which the feature values of multiple groups each including a certain number of feature points are registered. The feature point extracting unit 112, the generating unit 113, the feature value calculating unit 114, the specifying unit 115, and the authentication unit 116 perform a biometric authentication process by using the enrolled biometric information stored in the storage unit 111.

Figure 2:
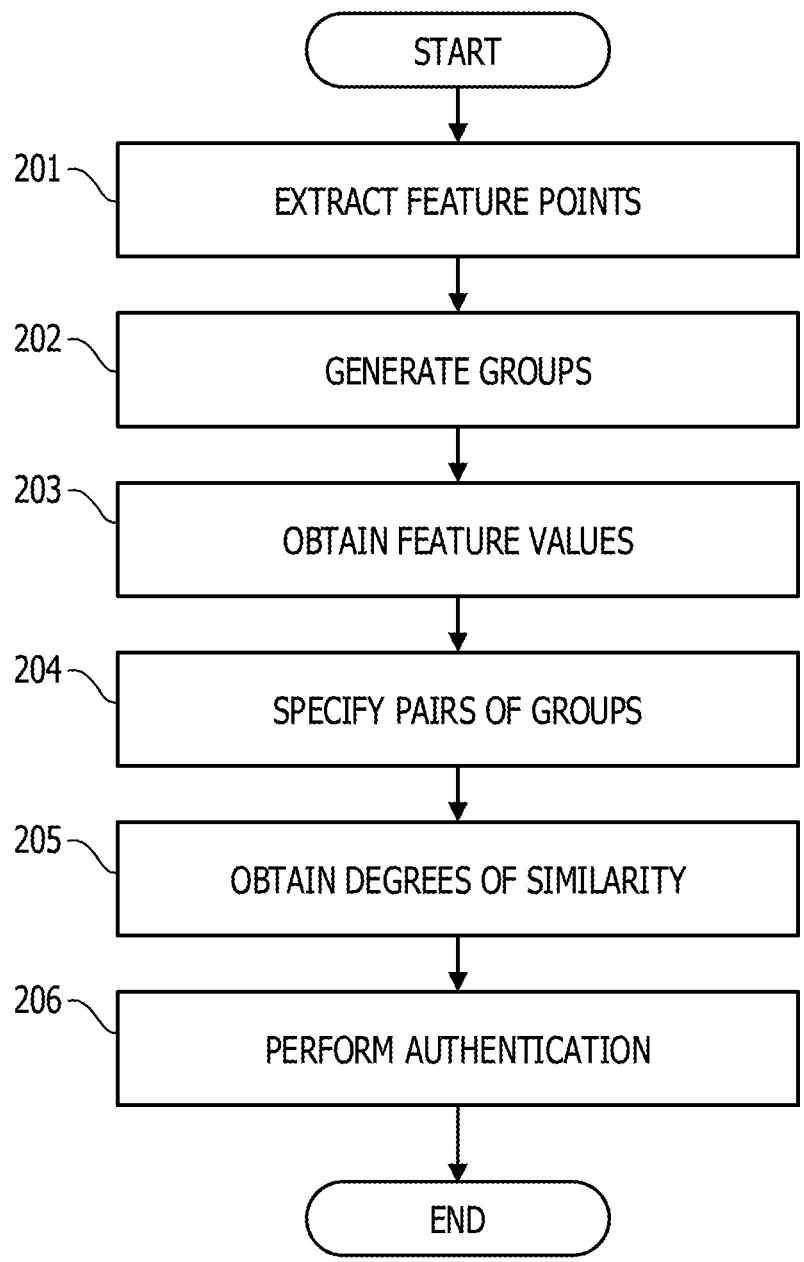
FIG. 2 illustrates an exemplary biometric authentication process.

FIG. 2 illustrates an exemplary biometric authentication process performed by the biometric authentication apparatus 101 in FIG. 1. The feature point extracting unit 112 extracts multiple feature points from a biometric image of a living body that is to be authenticated (step 201). The generating unit 113 generates multiple groups each including the certain number of feature points among the extracted feature points (step 202). The feature value calculating unit 114 obtains the feature value for each group (step 203).

The specifying unit 115 compares the feature value of each of the groups generated from the biometric image with the feature value of every group included in the enrolled biometric information, and specifies pairs of similar groups (step 204). In each pair having a first group and a second group, the authentication unit 116 obtains the degree of similarity between each of the first feature points included in the first group and the corresponding second feature point included in the second group in accordance with the number of groups similar to the first group (step 205). The authentication unit 116 authenticates the living body, which is to be authenticated, based on the degrees of similarity (step 206).

The biometric authentication apparatus 101 described above may improve authentication accuracy of biometric authentication based on groups of feature points extracted from a biometric image.

Figure 3:
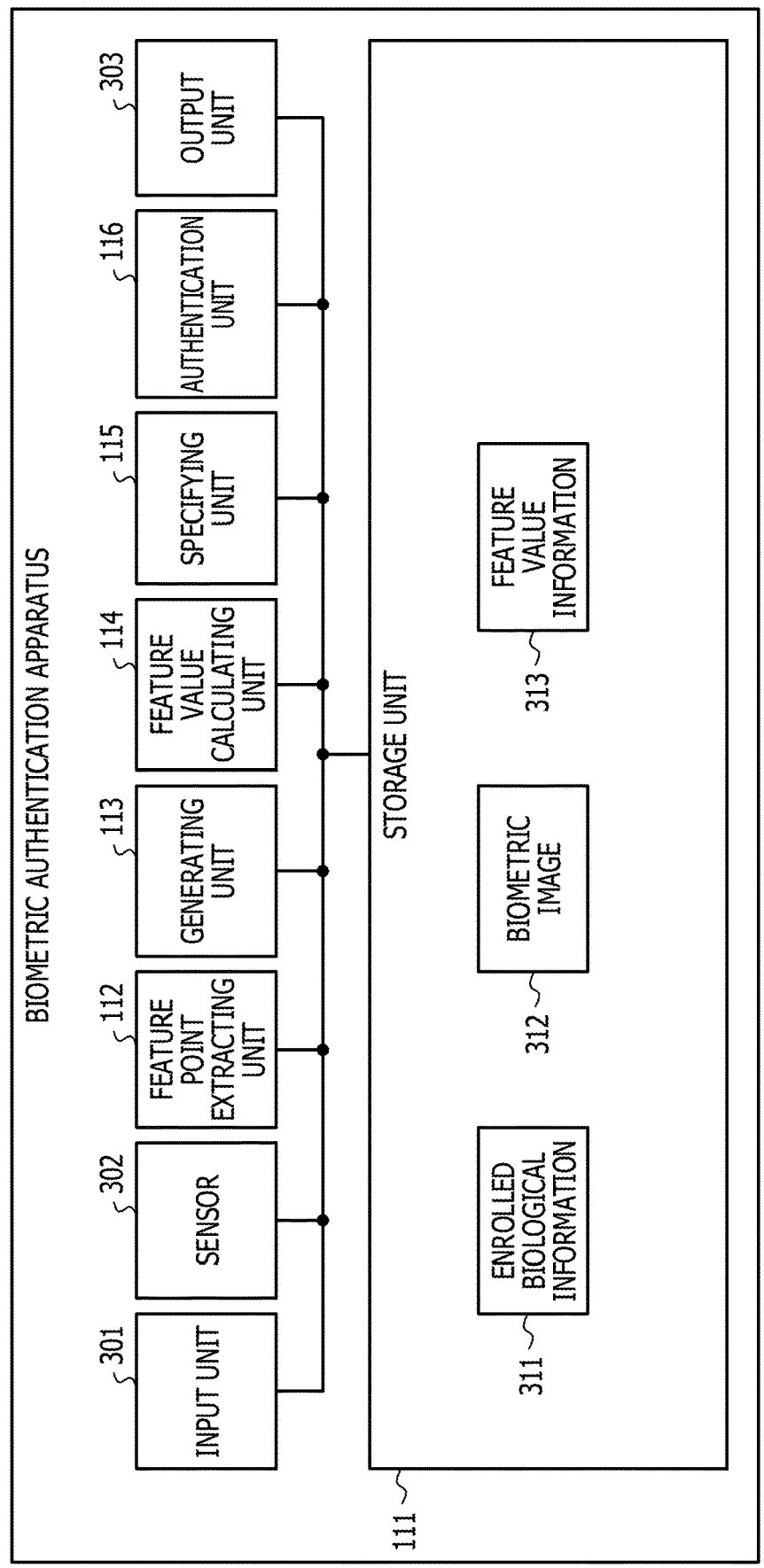
FIG. 3 illustrates an exemplary functional configuration of a biometric authentication apparatus.

FIG. 3 illustrates an exemplary biometric authentication apparatus 101 in FIG. 1. The biometric authentication apparatus 101 in FIG. 3 includes the storage unit 111, the feature point extracting unit 112, the generating unit 113, the feature value calculating unit 114, the specifying unit 115, the authentication unit 116, an input unit 301, a sensor 302, and an output unit 303. The biometric authentication apparatus 101 is used in various cases including logging in to an information processing apparatus and entering a security area.

The storage unit 111 stores enrolled biometric information 311. The enrolled biometric information 311 includes the feature values of multiple groups each having the certain number of feature points extracted from biometric images of registered persons. As a biometric image of a registered person, a fingerprint image, a palm print image, a vein image, a face image, or the like of the registered person is used. In FIGS. 1 and 3, the storage unit 111 is included in the biometric authentication apparatus 101. Alternatively, the storage unit 111 may be detachable from the biometric authentication apparatus 101 via a connector, or may be included in another information processing apparatus and may be communicatively connected to the biometric authentication process apparatus 101 over a network.

The input unit 301 receives a user identification (ID) which is identification information for identifying a registered person, in a registration process of generating the enrolled biometric information 311. As the input unit 301, for example, a keyboard and an ID card reader may be used. When a biometric authentication process with ID authentication (one-to-one authentication) is performed, the input unit 301 may receive the user ID for identifying an authentication target person.

The sensor 302 obtains a biometric image of a registered person or an authentication target person. For example, when the biometric image is a fingerprint image, a fingerprint sensor is used as the sensor 302. When the biometric image is a vein image, a vein sensor is used as the sensor 302. When the biometric image is a palm print image or a face image, a camera is used as the sensor 302. A biometric image of the authentication target person is stored in the storage unit 111 as a biometric image 312.

The feature point extracting unit 112 extracts multiple feature points from a biometric image obtained by the sensor 302. For example, when the biometric image is a fingerprint image, minutiae, such as an end point, at which a fingerprint ridge ends, and a bifurcation point, at which a fingerprint ridge bifurcates, are extracted as feature points.

The generating unit 113 generates multiple groups each including the certain number of feature points having geometric properties, among the feature points extracted by the feature point extracting unit 112. For example, when each group includes three feature points, the generating unit 113 selects one of the feature points extracted from the biometric image, as a target feature point. The generating unit 113 chooses feature points, whose number is n (n is an integer equal to or greater than three), in ascending order of the distance from the target feature point.

The generating unit 113 selects a combination of two feature points from the n feature points having been chosen, and generates a group including the two selected feature points and the target feature point. In this case, the number of groups generated from one target feature point is $_nC_2$, and each group is represented by a triangle having three feature points as vertices.

Figure 4:
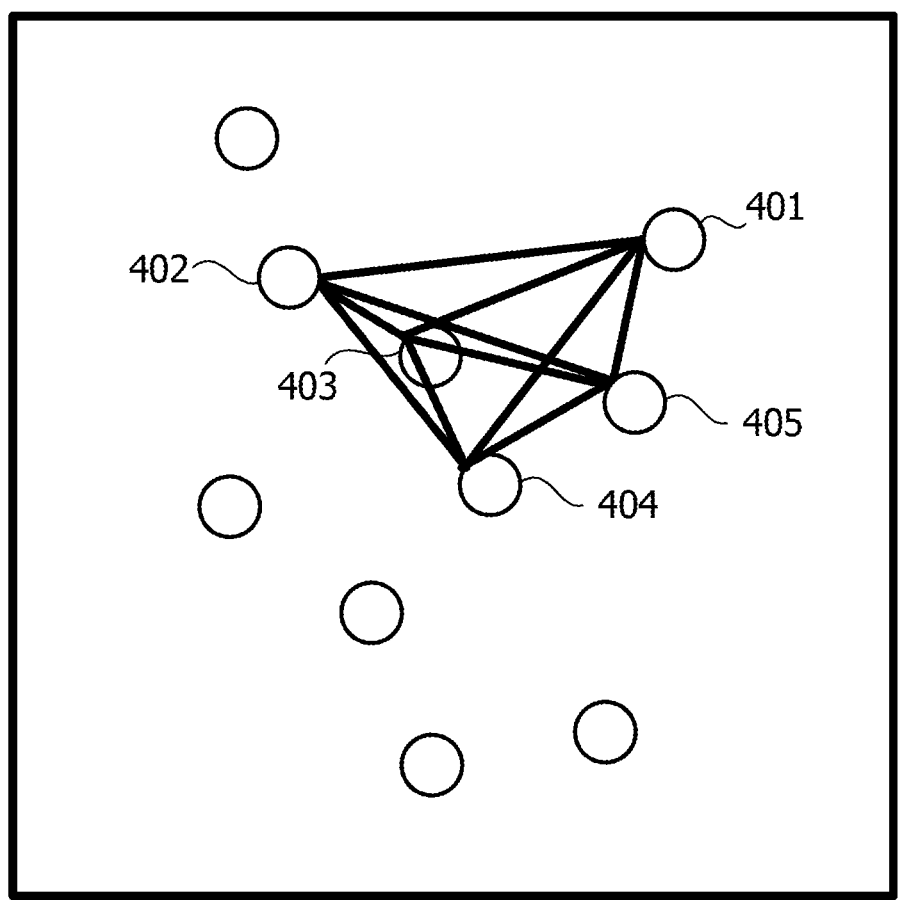
FIG. 4 illustrates exemplary triangles generated from a target feature point.

FIG. 4 illustrates an exemplary triangle generated from a target feature point when n=4. Among the feature points indicated by ten circular marks in FIG. 4, four feature points closer to a target feature point 401 are feature points 402 to 405. The number of combinations obtained by selecting two feature points from the feature points 402 to 405 is six. Therefore, the number of triangles generated from the target feature point 401 is also six. Each of the triangles corresponds to a group.

Figure 5:
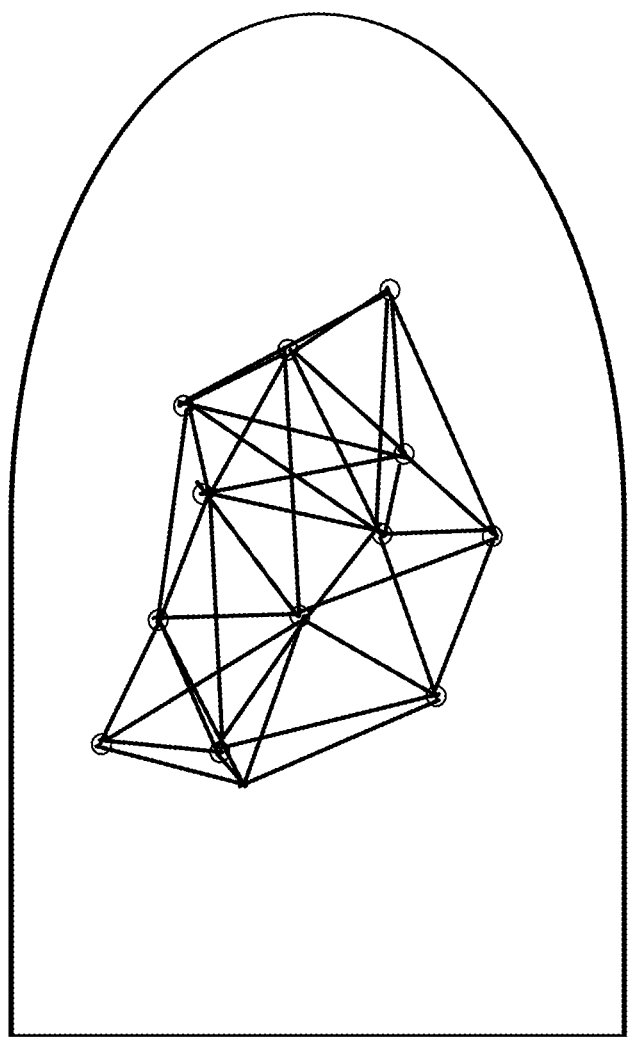
FIG. 5 illustrates exemplary triangles generated from multiple feature points.

FIG. 5 illustrates exemplary triangles generated from multiple feature points included in a fingerprint image, when n=4. Each of the feature points indicated by 13 circular marks in FIG. 5 is selected as a target feature point. Similarly to FIG. 4, six triangles are generated from the four feature points close to each target feature point. More feature points are extracted from an actual fingerprint image. In this case, the number of generated triangles increases.

The generating unit 113 may generate groups by using a different method. For example, the generating unit 113 may choose n feature points that are present in a certain distance from a target feature point, and may generate $_nC_2$ triangles from the feature points. Alternatively, the generating unit 113 may generate triangles, which do not overlap each other, through Delaunay triangulation division. The number of feature points included in each group may be two or equal to or greater than four.

The feature value calculating unit 114 generates the feature value of each group by using local features indicated by the certain number of feature points included in the group. For example, when each group includes three feature points, the feature value of the triangle having the feature points as vertices is calculated. When a biometric image obtained by the sensor 302 is a biometric image of a registered person, the feature value calculating unit 114 generates the enrolled biometric information 311 including the feature values of multiple groups generated from the biometric image, and stores the enrolled biometric information 311 in the storage unit 111.

FIG. 6 illustrates exemplary enrolled biometric information 311. The enrolled biometric information 311 in FIG. 6 includes the user ID, the group ID, and the group feature value. The user ID indicates identification information of a registered person. The group ID indicates identification information of a group.

The group feature value indicates the feature value of a triangle of each group, and includes feature point IDs which are identification information of the vertices of the triangle, the length of each side of the triangle, and the interior angles of the triangle. For example, the feature point IDs indicating the vertices of the triangle of the group ID "01" corresponding to the user ID "0001" are "M01", "M05", and "M21". When the biometric image is a fingerprint image, the group feature value may further include the type (the end point, the bifurcation point, or the like) of each feature point, the orientation of each feature point, and the number of fingerprint ridges crossing each side. It is unnecessary for the group feature value to include all of these local features. The group feature value may include only some of the local features.

When a biometric image obtained by the sensor 302 is the biometric image 312 of the authentication target person, the feature value calculating unit 114 stores the feature values of multiple groups generated from the biometric image 312, in the storage unit 111 as feature value information 313.

The specifying unit 115 compares the feature value information 313 for the multiple groups with the feature values of the multiple groups included in the enrolled biometric information 311, and specifies combinations of two similar groups. Then, the specifying unit 115 extracts feature point pairs included in the groups, as feature-point matching pairs. One group in a specified combination of two groups may be similar only to the other group, and may be similar to two or more groups including the other group.

Figure 7:
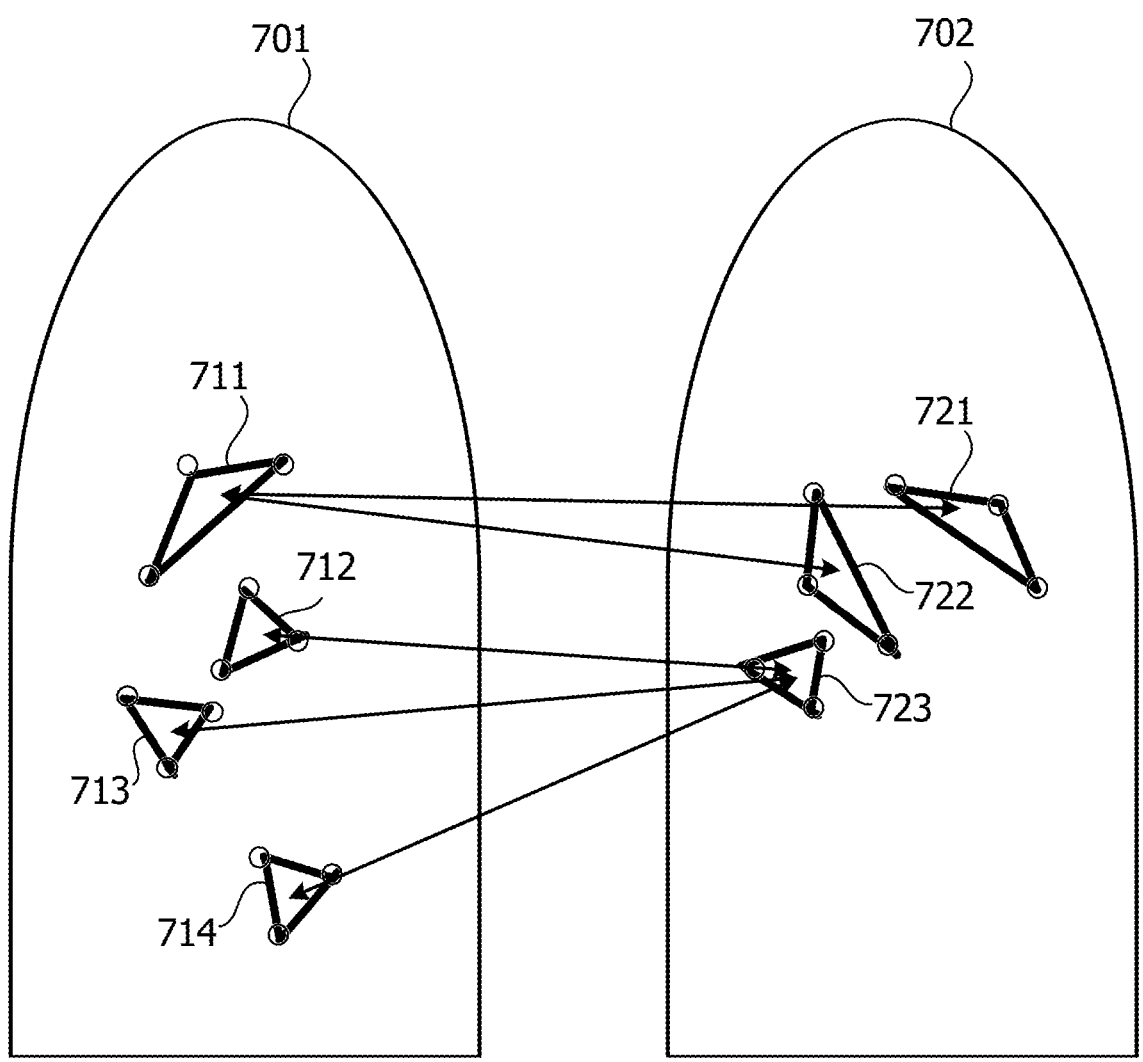
FIG. 7 illustrates an exemplary comparison result.

FIG. 7 illustrates an exemplary result of comparison between groups generated from the biometric image 312 and groups included in the enrolled biometric information 311. In this example, triangles 711 to 714 are generated from a fingerprint image 701 of the authentication target person, and the enrolled biometric information 311 indicates triangles 721 to 723 generated from a fingerprint image 702 of a registered person.

A two-way arrow indicates a pair of triangles similar to each other. The triangle 711 is similar to the triangle 721 and the triangle 722. The triangle 723 is similar to the triangles 712 to 714.

The authentication unit 116 calculates the degree of similarity between two feature points for each feature-point matching pair extracted by the specifying unit 115. The feature points included in a group similar to multiple different groups have a high probability of occurrence because of the shape of the triangle, information about the feature points, and the like. Thus, an incorrect feature-point matching pair may be extracted from the groups. In this case, it is desirable to perform weighting so that the degree of similarity of the extracted feature-point matching pair is made small.

Therefore, the authentication unit 116 calculates the degree of similarity of a feature-point matching pair in accordance with the number of groups similar to one group of the two similar groups. The larger the number of groups similar to one group is, the smaller the degree of similarity of the feature-point matching pair is.

The authentication unit 116 authenticates the authentication target person based on the degrees of similarity of all the feature-point matching pairs extracted from the multiple groups from the biometric image 312 and multiple groups from the enrolled biometric information 311. For example, the authentication unit 116 compares the total of the degrees of similarity of all the feature-point matching pairs with a given threshold. If the total of the degrees of similarity exceeds the threshold, the authentication unit 116 determines that the authentication target person is the registered person themselves.

The output unit 303 outputs the authentication result to the authentication target person or an administrator. The output unit 303 may be a display device which displays the authentication result on a screen, or may be a communication device which transmits the authentication result over a communication network to a different apparatus.

The biometric authentication apparatus 101 in FIG. 3 may reduce an influence, on an authentication result, of a group that includes feature points occurring with a high probability and that is likely to match a group of a different user. Thus, the possibility that the biometric image 312 of the authentication target person incorrectly matches a group feature value of a different person included in the enrolled biometric information 311 is decreased, improving the authentication accuracy. Therefore, risk of false authentication in which a different person is determined to be the registered person themselves may be reduced.

With reference to FIGS. 8 to 11, the registration process and the biometric authentication process performed by the biometric authentication apparatus 101 in FIG. 3 will be described in more detail.

The registration process is a process of registering, in the enrolled biometric information 311, the group IDs and the group feature values of the groups generated from a biometric image of each registered person, in association with the user ID of the registered person. In contrast, the biometric authentication process is a process of comparing the group feature values of the groups generated from the biometric image 312 of the authentication target person with group feature values enrolled in the enrolled biometric information 311 and authenticating the authentication target person.

Figure 8:
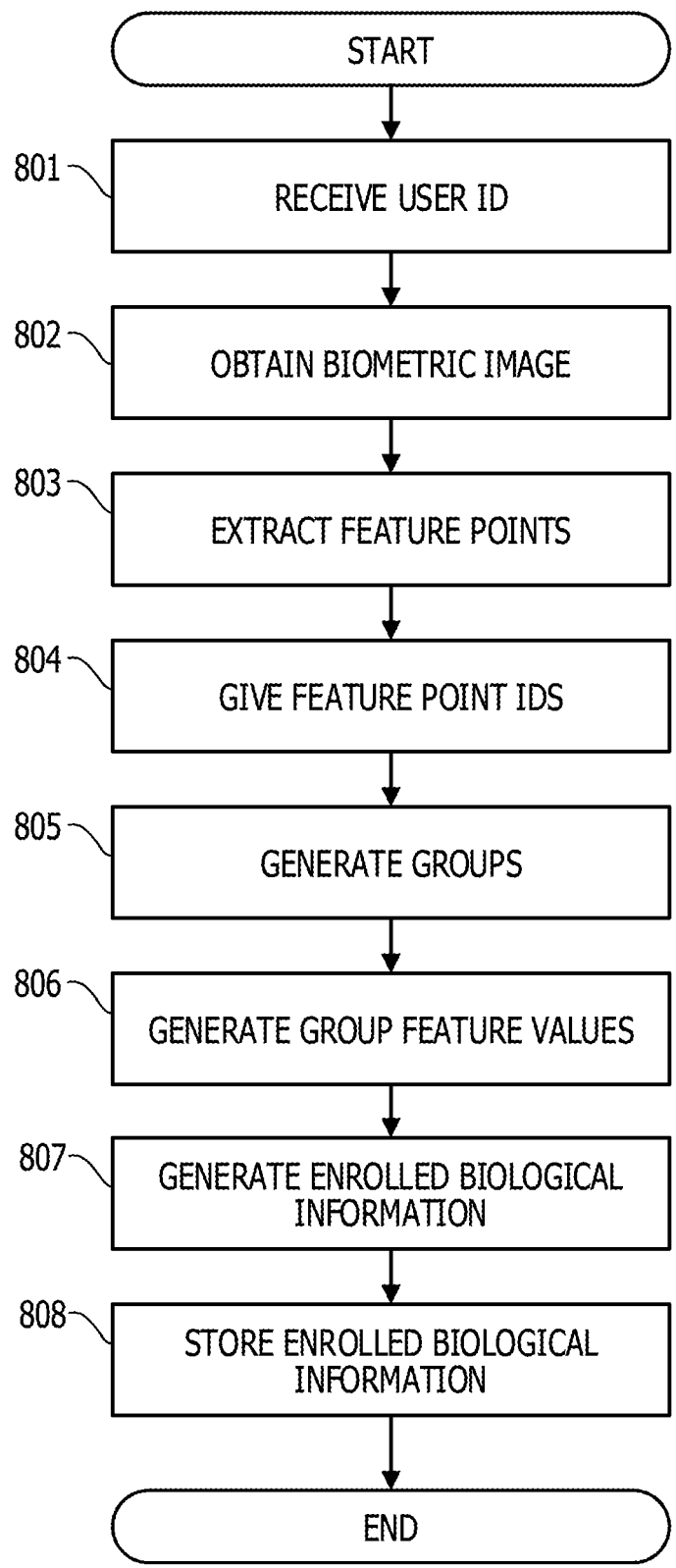
FIG. 8 illustrates an exemplary registration process.

FIG. 8 illustrates an exemplary registration process. The input unit 301 receives the user ID of a to-be-registered person (step 801). The sensor 302 obtains a biometric image of the to-be-registered person (step 802).

The feature point extracting unit 112 extracts multiple feature points from the biometric image of the to-be-registered person (step 803), and gives the feature point ID to each feature point (step 804). The generating unit 113 generates multiple groups each including the certain number of feature points among the extracted feature points (step 805).

The feature value calculating unit 114 uses local features indicated by the feature points included in each group, so as to generate the feature value of the group (step 806). The feature value calculating unit 114 generates the enrolled biometric information 311 including the feature values of the multiple groups (step 807), and stores the enrolled biometric information 311 in the storage unit 111 (step 808).

Figure 9:
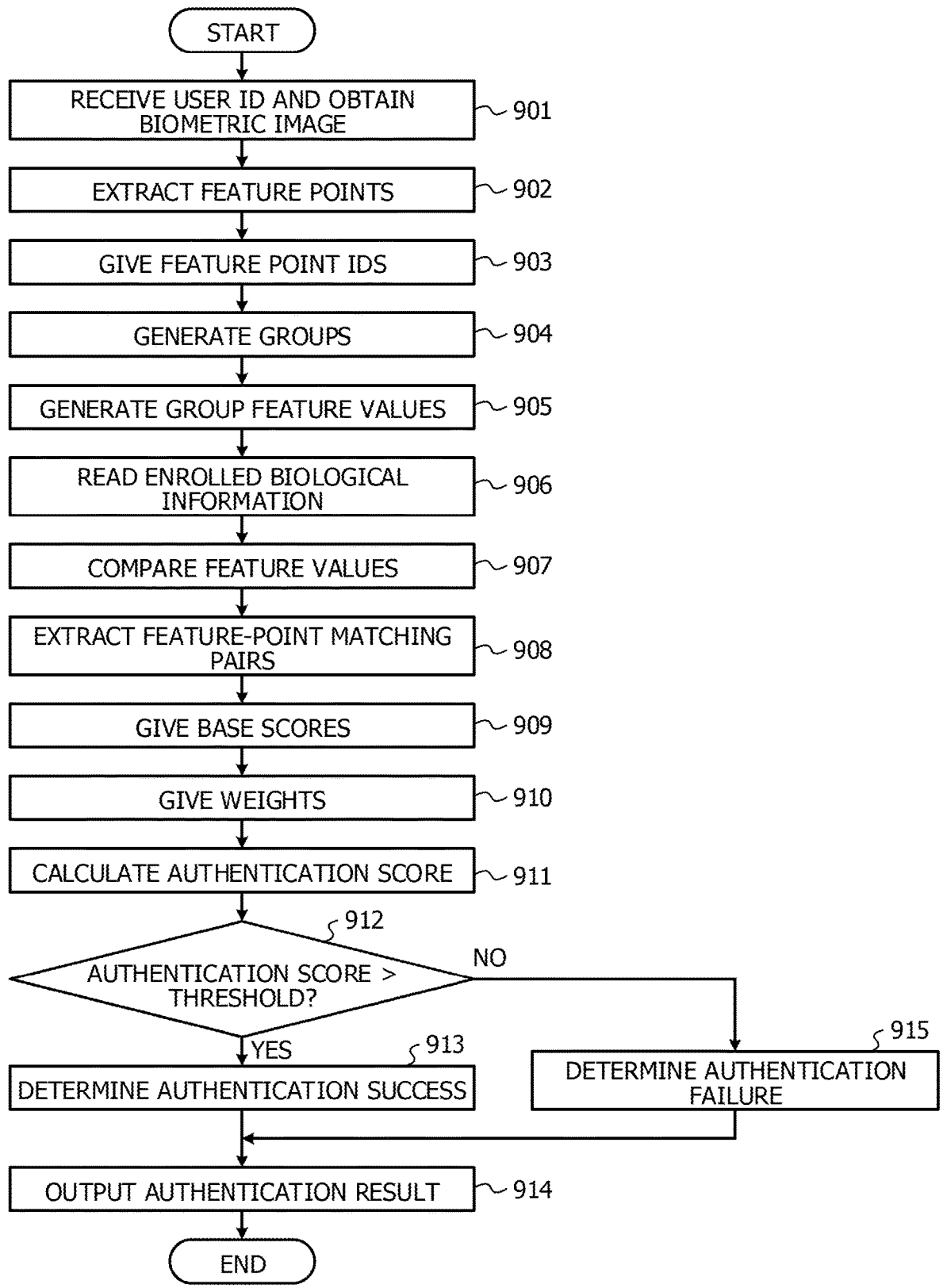
FIG. 9 illustrates an exemplary biometric authentication process.

FIG. 9 illustrates an exemplary biometric authentication process illustrated in FIG. 2. In the biometric authentication process in FIG. 9, the user ID of the authentication target person is used to perform one-to-one authentication. The input unit 301 receives the user ID of the authentication target person, and the sensor 302 obtains the biometric image 312 of the authentication target person (step 901).

The feature point extracting unit 112 extracts multiple feature points from the biometric image 312 (step 902), and gives the feature point ID to each feature point (step 903). The generating unit 113 generates multiple groups each including the certain number of feature points among the extracted feature points (step 904). The feature value calculating unit 114 uses local features indicated by the feature points included in each group, so as to generate the feature value of the group as the feature value information 313 (step 905).

The specifying unit 115 reads, from the storage unit 111, the enrolled biometric information 311 corresponding to the user ID of the authentication target person (step 906), and compares the feature value information 313 for multiple groups with the feature values of the multiple groups included in the extracted enrolled biometric information 311 (step 907). The specifying unit 115 specifies pairs of similar groups, and extracts feature-point matching pairs from these groups (step 908).

The authentication unit 116 gives a base score, which serves as the basis of the degree of similarity, to each feature-point matching pair extracted by the specifying unit 115 (step 909). The authentication unit 116 gives a weight for the score in accordance with the number of groups similar to a group to which one feature point of each feature-point matching pair belongs (step 910).

The authentication unit 116 obtains the degree of similarity by multiplying the weight of each feature-point matching pair by the score, sums the degrees of similarity of all the feature-point matching pairs, and calculates the authentication score of the biometric image 312 (step 911). The authentication unit 116 compares the authentication score with the given threshold (step 912). If the authentication score exceeds the threshold (YES in step 912), the authentication unit 116 determines that the authentication has succeeded (step 913). The output unit 303 outputs an authentication result indicating the authentication success (step 914).

In contrast, if the authentication score is equal to or less than the threshold (NO in step 912), the authentication unit 116 determines that the authentication has failed (step 915). The output unit 303 outputs an authentication result indicating the authentication failure (step 914).

Figure 10:
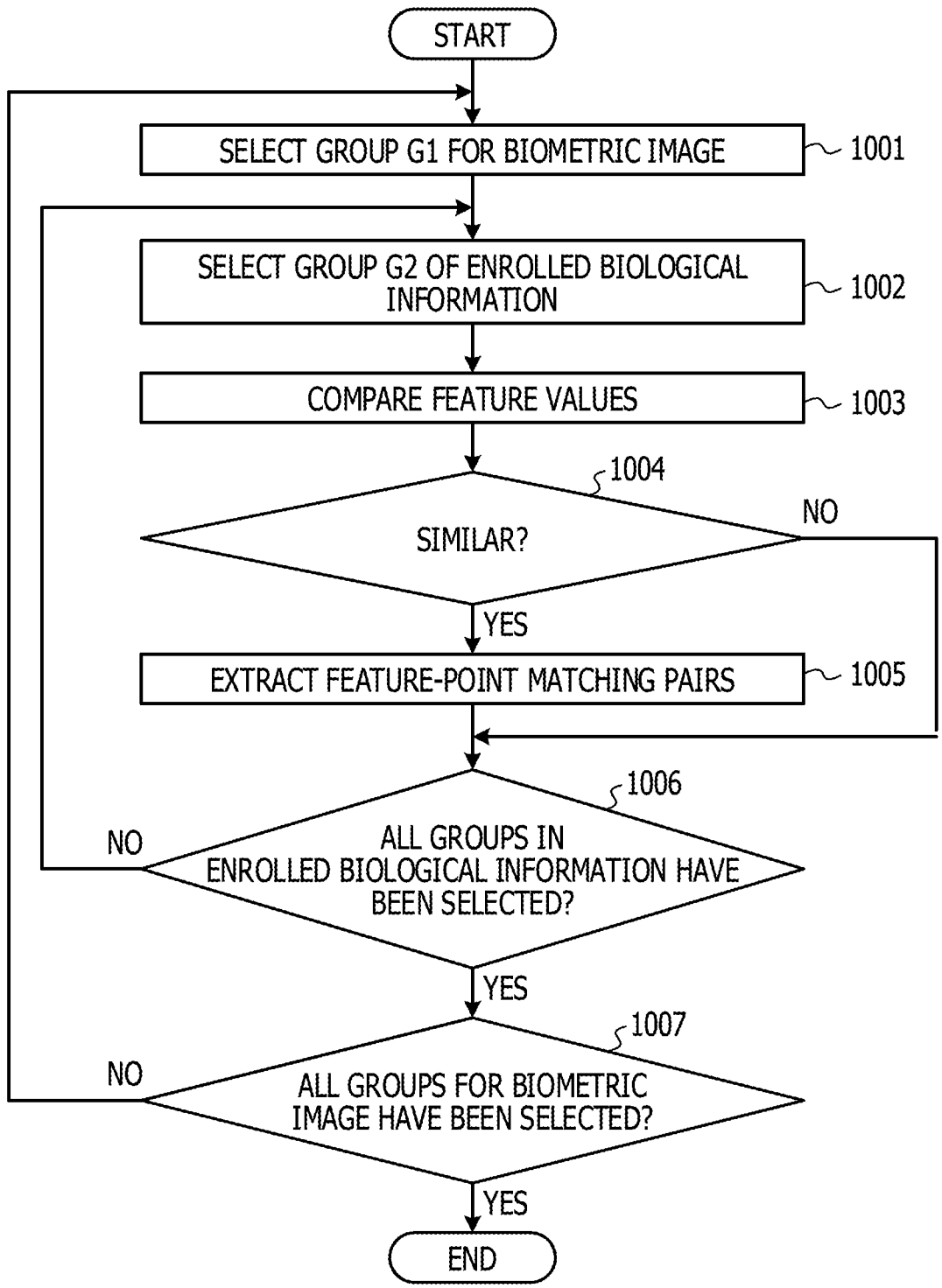
FIG. 10 illustrates an example of a feature-value comparison process and a feature-point matching pair extraction process.

FIG. 10 illustrates an exemplary feature-value comparison process in step 907 in FIG. 9, and an exemplary feature-point matching pair extraction process in step 908. The specifying unit 115 selects a group G1 which is one of the multiple groups from the biometric image 312 (step 1001), and selects a group G2 which is one of the multiple groups in the extracted enrolled biometric information 311 (step 1002).

The specifying unit 115 compares the feature value information 313 for the group G1 with the feature value of the group G2 (step 1003), and determines whether or not the group G1 is similar to the group G2 (step 1004).

For example, if the biometric image 312 is a fingerprint image and if the group G1 and the group G2 are each indicated by a triangle, the specifying unit 115 may determine whether or not the group G1 is similar to the group G2 based on the following determination criteria.

(C1) The difference between the length of each side of the triangle of the group G1 and the length of the corresponding side of the triangle of the group G2 is equal to or less than a given threshold.

(C2) The difference between each interior angle of the triangle of the group G1 and the corresponding interior angle of the triangle of the group G2 is equal to or less than a given threshold.

(C3) The type of each feature point of the triangle of the group G1 matches the type of the corresponding feature point of the triangle of the group G2.

(C4) The difference between the angle indicating the orientation of each feature point of the triangle of the group G1 and the angle indicating the orientation of the corresponding feature point of the triangle of the group G2 is equal to or less than a given threshold.

(C5) The number of fingerprint ridges crossing each side of the triangle of the group G1 matches the number of fingerprint ridges crossing the corresponding side of the triangle of the group G2.

If all of conditions (C1) to (C5) are satisfied, the specifying unit 115 determines that the group G1 is similar to group G2. If any of the conditions is not satisfied, the specifying unit 115 determines that the group G1 is not similar to the group G2. In accordance with the stability of reproduction of the biometric image 312, the specifying unit 115 may use only one or more conditions among (C1) to (C5), or may add another condition.

If the group G1 is similar to the group G2 (YES in step 1004), the specifying unit 115 extracts, as a feature-point matching pair, each feature point of the group G1 and the corresponding feature point of the group G2 (step 1005). For example, if the group G1 and the group G2 are each indicated by a triangle, three feature-point matching pairs are extracted.

The specifying unit 115 checks if all of the groups in the extracted enrolled biometric information 311 have been selected (step 1006). If there remains a group that has not been selected (NO in step 1006), the process of step 1002 and its subsequent steps is repeatedly performed on the next group.

If all of the groups in the extracted enrolled biometric information 311 have been selected (YES in step 1006), the specifying unit 115 checks if all of the groups for the biometric image 312 have been selected (step 1007). If there remains a group that has not been selected (NO in step 1007), the specifying unit 115 repeatedly performs the process of step 1001 and its subsequent steps on the next group. If all of the groups for the biometric image 312 have been selected (YES in step 1007), the specifying unit 115 ends the process.

In step 908 in FIG. 9, for example, the specifying unit 115 specifies multiple pairs of groups, and extracts, from these pairs, feature-point matching pairs p1, p2, . . . , pk, whose total number is equal to k (k is an integer equal to or greater than two). In this case, in step 909, the authentication unit 116 gives the base score Si to each feature-point matching pair pi (i=1 to k). For example, the base scores S1 to Sk may have the same value.

In step 910, the authentication unit 116 gives the weight wi to each feature-point matching pair pi according to the following expressions.

(a) If each of the two feature points of the feature-point matching pair pi is included in a group similar to only one group, $$wi=1 \quad \text{(Expression (1))}.$$

(b) If one of the two feature points of the feature-point matching pair pi is included in a group similar to groups whose number is equal to r (r is an integer equal to or greater than two), $$wi=1/(r \times c)<1 \quad \text{(Expression (2))}.$$

In Expression (2), c is a certain constant equal to or greater than one. The authentication unit 116 may give the weight wi by using a computational expression other than Expressions (1) and (2) in accordance with properties of the biometric image 312.

In step 911, the authentication unit 116 calculates the degree Qi of similarity between the two feature points included in each feature-point matching pair pi.

$$Qi=wi \times Si \quad \text{Expression (3)}$$

If the base scores S1 to Sk have the same value, the larger the number r of groups similar to one group of a group pair is, the smaller the weight wi in Expression (2) is. Thus, the similarity degree Qi in Expression (3) is made small.

The authentication unit 116 uses the similarity degree Qi in Expression (3) to calculate the authentication score ST for the biometric image 312 by using the following expression.

$$ST=Q1+Q2+\ldots+Qk \quad \text{Expression (4)}$$

A feature-point matching pair pi used in the case of (b) described above may be also included in one or more different group pairs, each of which has groups associated with each other in the one-to-one relationship and whose number is equal to m (m is an integer equal to or greater than one). In this case, the authentication unit 116 may use the following expression instead of Expression (2) to give the weight wi to the feature-point matching pair pi.

$$wi=1/(r \times c)+\alpha \times m \quad \text{Expression (5)}$$

In Expression (5), α is a given constant. If the right side of Expression (5) exceeds one, wi is set to one. By using the weight wi as described above, the weight wi of a feature-point matching pair pi belonging to both of a group pair having a group similar to multiple groups and a group pair corresponding to a triangle whose shape occurs with a low probability may be made larger than the value obtained by using Expression (2). Thus, an influence of such a feature-point matching pair pi on the authentication score ST is made larger, improving the authentication accuracy.

In the case of (b) described above, the authentication unit 116 may use, instead of Expression (2), a constant equal to or greater than zero and less than one as the weight wi. For example, if wi is set to 0, the similarity degree Qi of a feature-point matching pair having a feature point included in a group similar to multiple groups is set to 0. This enables the authentication score ST to be calculated by excluding such feature-point matching pairs.

The biometric authentication process in FIG. 9 may reduce an influence, on the authentication score ST, of a group that includes a feature point which occurs with a high probability and that is likely to match a group for a different user. Therefore, occurrence of incorrect correspondence between feature points that are likely to match each other in different portions is suppressed. Thus, the possibility that the biometric image 312 of the authentication target person incorrectly matches group feature values of a different person included in the enrolled biometric information 311 is reduced.

The configuration of the biometric authentication apparatus 101 in FIGS. 1 and 3 is merely exemplary. One or more of the components may be omitted or changed in accordance with the usage or condition of the biometric authentication apparatus 101. For example, when the sensor 302 is provided outside the biometric authentication apparatus 101, the sensor 302 may be omitted from the biometric authentication apparatus 101 in FIG. 3.

The flowcharts in FIG. 2 and FIGS. 8 to 10 are merely exemplary. One or more of the processes may be skipped or changed in accordance with the configuration or condition of the biometric authentication apparatus 101. For example, when an apparatus different from the biometric authentication apparatus 101 performs the registration process, the registration process in FIG. 8 may be skipped.

In the biometric authentication process in FIG. 9, when 1-to-N authentication, instead of one-to-one authentication, is performed, in step 901, the input unit 301 may skip reception of the user ID of the authentication target person.

In this case, the biometric authentication apparatus 101 uses the group feature values corresponding to the user ID of each registered person included in the enrolled biometric information 311, so as to perform the process in steps 906 to 913 for the user ID of the registered person.

The triangles in FIGS. 4, 5, and 7 and the enrolled biometric information 311 in FIG. 6 are merely exemplary. The groups and the enrolled biometric information 311 which are generated from the feature points of a biometric image are changed in accordance with the biometric image obtained by the sensor 302. The biometric image may be a vein image, a palm print image, or a face image. The number of feature points included in each group may be two or equal to or greater than four.

Figure 11:
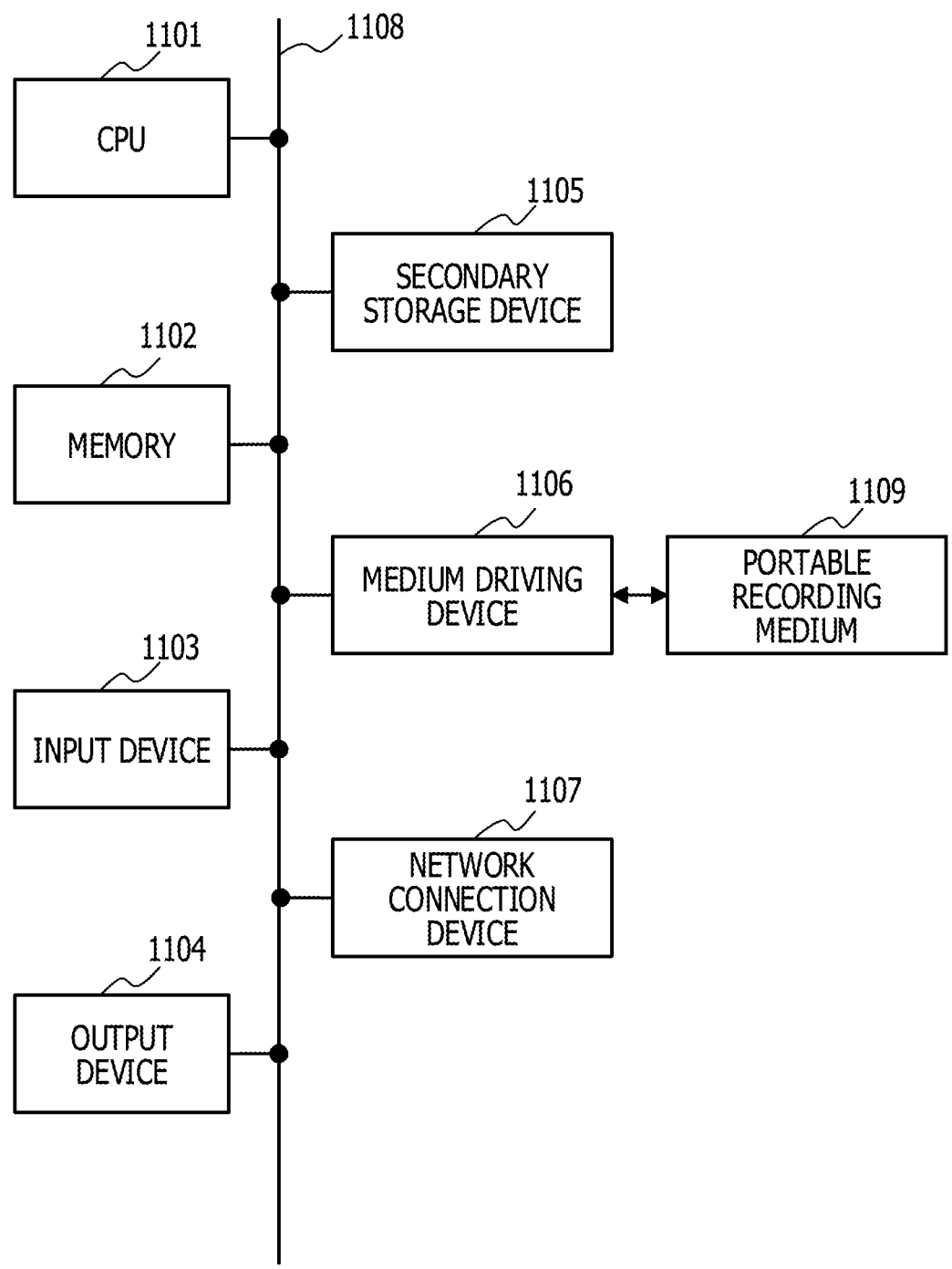
FIG. 11 illustrates an exemplary information processing apparatus.

FIG. 11 illustrates an exemplary information processing apparatus (computer) used as the biometric authentication apparatus 101 in FIGS. 1 and 3. The information processing apparatus in FIG. 11 includes a central processing unit (CPU) 1101, a memory 1102, an input device 1103, an output device 1104, a secondary storage device 1105, a medium driving device 1106, and a network connection device 1107. These components are connected to each other through a bus 1108. The sensor 302 in FIG. 3 may be connected to the bus 1108.

The memory 1102 indicates, for example, a read only memory (ROM), a random access memory (RAM), and a semiconductor memory such as a flash memory, and stores programs and data used in the process. The memory 1102 may be used as the storage unit 111 in FIGS. 1 and 3.

For example, the CPU 1101 (processor) executes programs by using the memory 1102, and functions as the feature point extracting unit 112, the generating unit 113, the feature value calculating unit 114, the specifying unit 115, and the authentication unit 116 in FIGS. 1 and 3.

The input device 1103 indicates, for example, a keyboard, a pointing device, and the like, and is used when an operator or a user inputs instructions or information. The input device 1103 may be used as the input unit 301 in FIG. 3. The output device 1104 indicates, for example, a display device, a printer, a speaker, and the like, and is used in inquiry to an operator or a user or output of a processing result. The output device 1104 may be used as the output unit 303 in FIG. 3. A processing result may be an authentication result.

The secondary storage device 1105 indicates, for example, a magnetic disk device, an optical disk device, a magneto-optical disk device, a tape device, and the like. The secondary storage device 1105 may be a flash memory or a hard disk drive. The information processing apparatus may store programs and data in the secondary storage device 1105, and may load, for use, the programs and the data onto the memory 1102. The secondary storage device 1105 may be used as the storage unit 111 in FIGS. 1 and 3.

The medium driving device 1106 drives a portable recording medium 1109, and accesses its recorded information. The portable recording medium 1109 is a memory device, a flexible disk, an optical disk, a magneto-optical disk, or the like. The portable recording medium 1109 may be a compact disk read only memory (CD-ROM), a digital versatile disk (DVD), a Universal Serial Bus (USB) memory, or the like. An operator or a user may store programs and data in the portable recording medium 1109, and may load, for use, the programs and the data onto the memory 1102.

Thus, a computer-readable recording medium storing programs and data used in the process is a physical (non-transitory) recording medium, such as the memory 1102, the secondary storage device 1105, or the portable recording medium 1109.

The network connection device 1107, which is connected to a communication network, such as a local area network or a wide area network, is a communication interface circuit which performs data conversion in communication. The information processing apparatus may receive programs and data from an external apparatus via the network connection device 1107, and may load, for use, the programs and the data onto the memory 1102. The network connection device 1107 may be used as the output unit 303 in FIG. 3.

The information processing apparatus does not necessarily include all of the components in FIG. 11. One or more of the components may be omitted in accordance with the usage or the condition. For example, when the information processing apparatus does not communicate with an operator or a user, the input device 1103 and the output device 1104 may be omitted. When the portable recording medium 1109 or the communication network are not used, the medium driving device 1106 or the network connection device 1107 may be omitted.

The embodiment of the present disclosure and its advantages are described in detail. Those skilled in the art may make various changes, additions, omissions without departing from the scope of the present disclosure described clearly in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    a memory; and
    a processor coupled to the memory and configured to:
        extract a plurality of feature points from a biometric image of a living body that is to be authenticated;
        generate a plurality of first groups each including a certain number of feature points among the plurality of feature points;
        obtain a first feature value of each of the plurality of first groups;
        compares, for each of the plurality of first groups, the first feature value with a second feature value of each of a plurality of second groups each including the certain number of feature points included in enrolled biometric information and stored in the memory;
        extract one or more second groups, which are similar to each of the plurality of first groups, from among the plurality of second groups;
        specify, as a first combination, a combination of each of the plurality of first groups and the one or more second groups;
        obtain a first degree of similarity between a first feature point included in a first group of the first combination and a second feature point included in the one or more second groups of the first combination in accordance with a number of the one or more second groups; and
        authenticate the living body based on the first degree of similarity,
    wherein the processor is configured to:

specify, as a second combination, a combination of another first group and another one or more second groups which are similar to each other and are different from the first combination; and obtain a second degree of similarity between a first feature point included in the another first group of the second combination and a second feature point included in the another one or more second groups of the second combination in accordance with a number of the another one or more second groups, and wherein, when the number of the one or more second groups is greater than the number of the another one or more second groups, the first degree of similarity is smaller than the second degree of similarity.

2. The information processing apparatus according to claim 1, wherein, as the number of the one or more second groups is increased, the first degree of similarity is decreased.

3. The information processing apparatus according to claim 1, wherein, when the number of the one or more second groups is equal to or greater than two, the processor sets the first degree of similarity to zero.

4. The information processing apparatus according to claim 1, wherein each of the plurality of first groups generated from the biometric image includes three feature points, and each of the plurality of second groups included in the enrolled biometric information includes three feature points.

5. The information processing apparatus according to claim 1, wherein the biometric image is a fingerprint image, a vein image, a palm print image, or a face image.

6. A non-transitory computer-readable recording medium for recording a biometric authentication program which causes a computer to execute a process, the process comprising:

extracting a plurality of feature points from a biometric image of a living body that is to be authenticated;

generating a plurality of first groups each including a certain number of feature points among the plurality of feature points;

obtaining a first feature value of each of the plurality of first groups;

comparing, for each of the plurality of first groups, the first feature value with a second feature value of each of a plurality of second groups each including the certain number of feature points included in enrolled biometric information and stored in the memory;

extracting one or more second groups, which are similar to each of the plurality of first groups, from among the plurality of second groups;

specifying, as a first combination, a combination of each of the plurality of first groups and the one or more second groups;

obtaining a first degree of similarity between a first feature point included in a first group of the first combination and a second feature point included in the one or more second groups of the first combination in accordance with a number of the one or more second groups;

authenticating the living body based on the first degree of similarity;

specifying, as a second combination, a combination of another first group and another one or more second groups which are similar to each other and are different from the first combination; and obtaining a second degree of similarity between a first feature point included in the another first group of the second combination and a fourth feature point included in a fourth group of the second combination in accordance with a number of the another one or more second groups, and wherein, when the number of the one or more second groups is greater than the number of the another one or more second groups, the first degree of similarity is smaller than the second degree of similarity.

7. The non-transitory computer-readable recording medium according to claim 6, wherein, as the number of the one or more second groups is increased, the first degree of similarity is decreased.

8. The non-transitory computer-readable recording medium according to claim 6, wherein, when the number of the one or more second groups is equal to or greater than two, the processor sets the first degree of similarity to zero.

9. The non-transitory computer-readable recording medium according to claim 6, wherein each of the plurality of first groups generated from the biometric image includes three feature points, and each of the plurality of second groups included in the enrolled biometric information includes three feature points.

10. The non-transitory computer-readable recording medium according to claim 6, wherein the biometric image is a fingerprint image, a vein image, a palm print image, or a face image.

11. A biometric authentication method comprising:

extracting a plurality of feature points from a biometric image of a living body that is to be authenticated;

generating a plurality of first groups each including a certain number of feature points among the plurality of feature points;

obtaining a first feature value of each of the plurality of first groups;

comparing, for each of the plurality of first groups, the first feature value with a second feature value of each of a plurality of second groups each including the certain number of feature points included in enrolled biometric information and stored in the memory;

extracting one or more second groups, which are similar to each of the plurality of first groups, from among the plurality of second groups;

specifying, as a first combination, a combination of each of the plurality of first groups and the one or more second groups;

obtaining a first degree of similarity between a first feature point included in a first group of the first combination and a second feature point included in the one or more second groups of the first combination in accordance with a number of the one or more second groups;

authenticating the living body based on the first degree of similarity;

specifying, as a second combination, a combination of another first group and another one or more second groups which are similar to each other and are different from the first combination; and obtaining a second degree of similarity between a first feature point included in the another first group of the second combination and a fourth feature point included in a fourth group of the second combination in accordance with a number of the another one or more second groups, and wherein, when the number of the one or more second groups is greater than the number of the another one or more second groups, the first degree of similarity is smaller than the second degree of similarity.

12. The biometric authentication method according to claim 11, wherein, as the number of the one or more second groups is increased, the first degree of similarity is decreased.

13. The biometric authentication method according to claim 11, wherein, when the number of the one or more second groups is equal to or greater than two, the processor sets the first degree of similarity to zero.

14. The biometric authentication method according to claim 11, wherein each of the plurality of first groups generated from the biometric image includes three feature points, and each of the plurality of second groups included in the enrolled biometric information includes three feature points.

15. The biometric authentication method according to claim 11, wherein the biometric image is a fingerprint image, a vein image, a palm print image, or a face image.

* * * * *